Oct. 7, 1969
D. E. LUPFER
3,471,582
CONTROL OF EXOTHERMIC REACTIONS
Filed Nov. 16, 1967
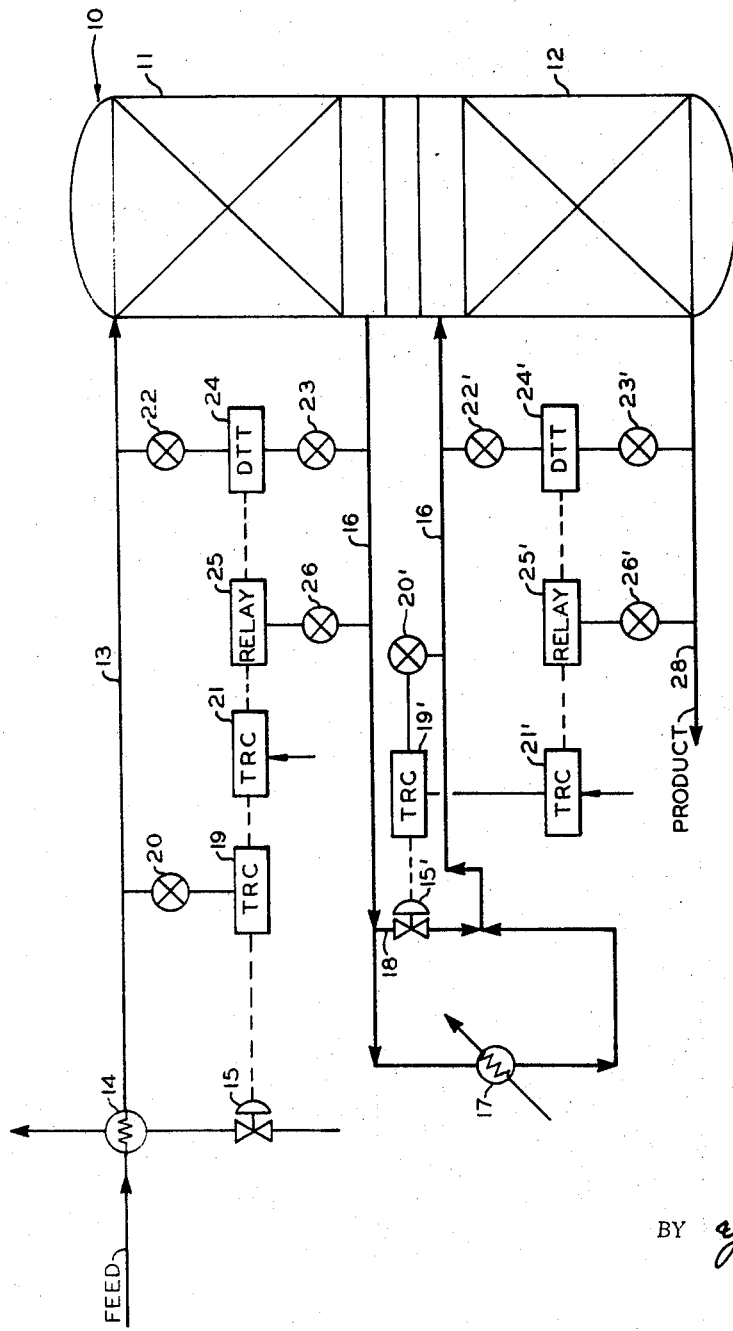
INVENTOR.
D.E. LUPFER
BY *Young & Quigg*
ATTORNEYS

United States Patent Office

3,471,582
Patented Oct. 7, 1969

3,471,582
CONTROL OF EXOTHERMIC REACTIONS
Dale E. Lupfer, Bartlesville, Okla., assignor to Phillips
Petroleum Company, a corporation of Delaware
Filed Nov. 16, 1967, Ser. No. 683,563
Int. Cl. C07c *11/00, 5/02*
U.S. Cl. 260—677
8 Claims

ABSTRACT OF THE DISCLOSURE

The desired temperature rise across an exothermic reactor is maintained by controlling the reactant feed temperature in response to the difference in temperature between the reactant feed and product streams from the reactor until a maximum predetermined product temperature is obtained. When the maximum predetermined product temperature is obtained, the reactant feed temperature is controlled solely in response to the product temperature thereby maintaining the product temperature at a level not greater than the predetermined maximum product temperature.

---

This invention relates to the control of exothermic reactions. In another aspect, this invention relates to the temperature control of exothermic reactions. In another aspect, this invention relates to the temperature control of exothermic reactions within a reaction zone whereby the temperature of the reaction is controlled by manipulating the reactant feed temperature in response to a temperature differential within the reaction zone and to the product temperature therefrom. In still another aspect, this invention relates to the temperature control of hydrogenation reactions.

In many catalytic and non-catalytic exothermic chemical reactions, it is necessary that the temperature of the reaction mixture be maintained within certain limits in order to (1) economically carry out the desired reaction and (2) prevent undesirable side reactions. This is particularly true for many hydrogenation, hydrodealkylation, and polymerization processes.

Selective hydrogenation reactions require extremely close temperature control. For example, a usual method of manufacturing olefins comprises passing a hydrocarbon material through a heating zone wherein such hydrocarbons are decomposed with the formation of hydrogen and one or more unsaturated compounds such as olefins or diolefins. Higher reaction temperatures are generally required to produce the maximum yield of unsaturated compounds. However, the high temperatures also result in the formation of acetylenic compounds which contaminate the product stream. Thus, for complete utilization of the olefin and diolefin-rich streams, it is usually necessary to remove substantially all of the acetylenic hydrocarbons. These acetylenic compounds are not readily removed without substantial loss of the more valuable olefin and diolefin constituents.

One method of removing the acetylenic hydrocarbon contaminants from the olefin and/or diolefin-rich stream involves contacting the contaminated mixture in the presence of hydrogen with a suitable hydrogenation catalyst at a proper temperature to selectively hydrogenate the acetylenic hydrocarbon contaminants without appreciable hydrogenation of the olefin and/or diolefin constituents. However, due to the exothermic nature of the hydrogenation reaction, an increased reaction temperature along the length of the catalyst bed results which substantially reduces the selectivity of the reaction. If, for example, the temperature gets too high, the catalyst will become more active and components other than acetylene will be converted. When this occurs, a tremendous amount of heat is released, and a dangerous situation exists. As the reaction temperatures climb even higher, unwanted polymerization will occur which results in the formation of polymers which, in turn, tend to poison the hydrogenation catalyst. On the other hand, if the reaction temperature is maintained very low, then commercially acceptable reaction rates for the selective hydrogenation process cannot be maintained, and acetylenic components will remain unconverted.

Conventionally, the temperature within the catalyst beds is controlled by heating the reactant stream to a predetermined selective hydrogenation temperature and either introducing cold inert material into the reactor or inserting heat exchangers within the catalyst bed to cool the hot gases therewithin. In general, these methods require rather high investment and operating cost per volume of reactant.

Therefore, one object of this invention is to provide an improved method and apparatus for controlling the temperature of exothermic chemical reactions.

Another object of this invention is to provide an improved method and apparatus for conducting selective hydrogenation processes.

A further object of this invention is to provide a method and apparatus for controlling the temperature in a selective hydrogenation reactor in a manner to provide maximum conversion of the component to be hydrogenated with a minimum of undesirable side reactions.

According to one embodiment of this invention, the temperature within an exothermic reaction zone is controlled by manipulating the reactant feed temperature in response to the difference in temperature between the product and reactant streams to thereby maintain a predetermined difference in temperature. When the product temperature reaches a predetermined maximum, the manipulation of the reactant feed temperature is automatically switched to respond solely to the product stream temperature. This control continues until the product temperature falls below the predetermined maximum, at which time, the manipulation of the reactant feed temperature is automatically switched to respond to the difference in temperature between the product and reactant streams.

In another embodiment of this invention, a lag is introduced into the control method above to compensate for the dynamic response of the differential temperature between the reactant and product streams when the feed temperature is being manipulated.

In another embodiment of this invention, a "dead zone" is introduced into the above control method to eliminate the phenomenon known as "chatter" or "hunting" (oscillation between the two control criteria, i.e., the differential temperature and the maximum process temperature).

In still another embodiment of this invention, an improved apparatus for carrying out exothermic chemical reaction is provided.

This invention can be more easily understood from a study of the drawing which is a schematic illustration of a preferred embodiment of this invention.

Now referring to the drawing, selective hydrogenation reactor 10 is illustrated having two catalytic reaction beds 11 and 12, respectively. It must be understood that the basic control method and apparatus for beds 11 and 12 are the same, and that this invention is not to be limited to the use of two beds. For example, one, two, three, or any desired number of catalytic beds in series can be controlled according to this invention. Specifically, this invention will be described in relation to the selective hydrogenation of acetylene within a hydrocarbon stream containing ethylene and hydrogen, for example. However, this invention can be utilized when carrying out other selective hydrogenation operations such as the conversion of diolefins to olefinic or more saturated compounds or of substituted acetylenes in the presence of diolefins and/or olefins. Furthermore, this invention can be utilized in many non-catalytic reactions such as, for example, the hydrodealkylation of toluene to benzene and methane, wherein it is necessary to maintain the reaction temperature within certain limits to prevent unwanted benzene hydrogenation. Catalytic reactor beds 11 and 12 are filled with any conventional selective hydrogenation catalyst known in the art, such as noble metals and/or salts, for example, palladium, supported on alumina such as disclosed in U.S. Patent 3,113,980, or alkalized iron oxide-chromium oxide, such as disclosed in U.S. Patent 2,814,653.

A mixed hydrocarbon feed is passed to catalyst bed 11 of reactor 10 via conduit 13 and heating means 14. The rate of flow of heating fluid through heating means 14 is manipulated by process control valve 15. Product from catalyst bed 11 is passed to catalyst bed 12 via conduit 16 which has cooling means 17 positioned therein. Process control valve 15' controls the rate of flow (or proportion) of product fluid which is by-passed around cooling means 17 via conduit 18. Product from catalyst bed 12 is removed via conduit 28.

During normal operations, process control valves 15 and 15' are operated by temperature controllers 19 and 19' respectively. Temperature controllers 19 and 19' can be any suitable type controllers known in the art, each having a set point signal input, a measurement signal input, and a control signal output. Temperature measuring and transmitting means 20 and 20' are operatively associated with conduits 13 and 16 respectively for the purpose of producing an output signal which is representative of the temperature of the fluids flowing through each respective conduit. The outputs from temperature sensing and transmitting means 20 and 20' are transmitted to the measurement signal input of temperature controllers 19 and 19' respectively. The measurement signal inputs from temperature sensing and transmitting means 20 and 20' are compared with the setpoint inputs of temperature controllers 19 and 19', respectively, which are received from temperature controllers 21 and 21' respectively. Output signals responsive to these comparisons are passed from temperature controllers 19 and 19' to process control valves 15 and 15' respectively to manipulate the respective rates of flow through each valve so as to cause each individual measured temperature to achieve its setpoint value.

Temperature sensing and transmitting means 22, 23, and 22', 23', respectively measure and transmit the temperature of the feed and product fluids to and from catalyst beds 11 and 12, respectively. Differential temperature transmitting means 24 and 24' each comprise any suitable type differential transmitter known in the art having two signal inputs and one signal output. Differential temperature transmitters 24 and 24' receive signal inputs from temperature sensing and transmitting means 22, 23, and 22', 23', respectively. The outputs from differential temperature transmitting means 24 and 24' which are representative of the differences in temperature between the feed and product streams to and from the respective catalyst beds are passed to relays 25 and 25', respectively. Relays 25 and 25' can be suitable selective relays known in the art having two signal inputs and a signal output. Relays 25 and 25' also receive input signals from temperature sensing and transmitting means 26 and 26', which signals are representative of the temperature of the product streams from catalyst beds 11 and 12, respectively. It is preferred that temperature controllers 19, 19', 21, and 21' be direct acting controllers, that valves 15 and 15' tend to close on receiving an increasing signal, and that selector relays 25 and 25' be such as to select and pass through the largest magnitude signal, respectively; however, any other operable combination known in the art can be selected. The output signals selected in relays 25 and 25' are passed to the measurement signal inputs of temperature controllers 21 and 21', respectively. It is preferred that temperature controllers 21 and 21' be the same type control mechanisms as temperature controllers 19 and 19', respectively.

Thus, the only basic difference in the control apparatus for catalyst beds 11 and 12 is that the temperature of the feed to catalyst bed 11 is controlled by heating means whereas the temperature of the feed to catalyst bed 12 is controlled by cooling means. Otherwise, the operation of each respective temperature control apparatus is the same. For this reason, the operation of this invention will be described in relation to the selective hydrogenation of acetylene in a hydrocarbon stream passed to catalyst bed 11.

A mixed hydrocarbon stream containing ethylene, hydrogen, and from about .01 to 2 weight percent acetylene is passed to catalyst bed 11 via conduit 13. This feed stream enters heating means 14 at a temperature from about 80 to about 110° F. and at a pressure within the range of 150 to 170 p.s.i.g. Heating means 14 heats the hydrocarbon stream flowing therethrough to a temperature in the range of from about 150 to about 215° F. The heated hydrocarbon stream then passes through catalyst bed 11 wherein the acetylene is selectively hydrogenated. The partially hydrogenated stream is removed via conduit 16. This stream is normally at a temperature in the range from about 175 to 230° F. The degree of conversion of the acetylene which takes place in catalyst bed 11 is a function of feed composition, feed heat content, and the condition of the catalyst. The major problem in operating a conventional selective hydrogenation reactor is a condition referred to as a "runaway." If, for example, the feed heat content gets too high, the catalyst will become more active and unwanted side reactions will occur such as polymerization and the hydrogenation of ethylene. Also, when this occurs, a tremendous amount of heat is released which can result in a dangerous situation which creates the possibility of explosion and/or fire as well as overheating damage to the catalyst.

This invention controls the temperature increase across the reactor bed at a desired value by manipulating the feed temperature until a maximum predetermined bed outlet temperature is reached. At this time, the manipulation of the feed temperature is switched so as to respond solely to the outlet temperature of the reactor. When the outlet temperature again falls below the maximum predetermined temperature, the manipulation of the feed temperature is automatically switched to respond again to the temperature differential across the reactor. The particular temperature differential and maximum outlet temperature utilized as control criteria will depend upon factors such as feed composition, the type of catalyst, and the condition of the catalyst. For the purpose of illustrating this invention, the differential temperature setpoint will be 15° F. and the maximum allowable temperature of the outlet stream will be 230° F.

Thus, a setpoint will be supplied to temperature controller 21 which corresponds to both the 15° F. desired temperature differential and the maximum allowable outlet stream temperature of 230° F. and relay 25 will pass a signal representative of the differential temperature between the feed and product streams from the differential temperature transmitting means 24 until the sensed outlet temperature reaches the maximum predetermined temperature of 230° F. When this maximum temperature is reached, the signal from temperature sensing and transmitting means 26 will be greater than the signal from differential temperature transmitting means 24; consequently, the signal output from relay 25 is switched to the larger signal and now the catalyst bed outlet temperature will be the control criterion. Temperature controller 21 will supply the setpoint to temperature controller 19 in response to a comparison of its setpoint with the selected signal output from relay 25. Once relay 25 has been switched so that the sole control criterion for manipulating the temperature of the feed stream is the temperature of the product stream, this control will continue until the signal from the differential temperature transmitter 24 becomes greater than the signal from the temperature sensing and transmitting means 26 (i.e., when the differential temperature is at least 15° F. and the product temperature is below 230° F.).

For example, in a typical acetylene hydrogenation, the feed temperature is maintained at 185° F. and the outlet temperature of the product in conduit 16 is maintained at 200° F. As the catalyst becomes less active, the outlet temperature will drop, thereby reducing the 15° F. differential, therefore the feed temperature will be increased to hold the differential temperature at 15° F. As this continues the catalyst becomes less and less active because of poisons in the feed; for example, the outlet temperature will approach the maximum predetermined temperature, 230° F., and the feed temperature will approach 215° F. When the outlet temperature reaches 230° F., relay 25 will automatically switch, and the output from relay 25 will correspond to the outlet catalyst bed temperature of 230° F. The action of temperature controllers 21 and 19 on valve 15 will result in the maintenance of the product temperature at 230° F., even though the differential temperature may now be less than 15° F., when process steady state conditions have been achieved. It is noted that at the point that relay 25 changes the control criterion to the outlet feed temperature, the temperature of the feed to the catalyst bed will be 215° F. or less, i.e., a differential temperature of at least 15° F. However, if the catalyst now becomes less active, the actions of temperature controllers 21 and 19 on valve 15 will result in an increase in the feed temperature to a point above 215° F. in order to hold the 230° F. temperature of the outlet stream. Thus, the feed temperature will go to, say, 220° F., and the differential temperature will be 10° F. Less conversion will be taking place at this lower differential temperature, but the possibility that the catalytic reactor will "run away," and the possibility that undesired side reactions such as polymerization and hydrogenation of ethylene may occur will be prevented.

If the catalyst now becomes more active, for example, due to the flushing of poisons from the reactor bed by the feed stream, temperature controllers 21 and 19 will cause valve 15 to decrease its opening so that less heat is supplied to heating means 14 so that the temperature of the feed mixture will decrease in order to maintain the temperature of the product stream at 230° F. As the catalyst becomes more and more active, the feed temperature decreases until it reaches 215° F. thereby achieving a differential temperature across the reactor of at least 15° F. Relay 25 then switches back to the differential temperature control criterion when the signal output from differential temperature transmitter 24 is greater than the signal output from temperature sensing and measuring means 26, i.e., when the differential temperature equals at least 15° F. and the outlet temperature from catalyst bed 11 is less than 230° F.

According to another embodiment of this invention, a lag is introduced into the control method to compensate for the dynamic response of the differential temperature when the temperature of the feed stream is manipulated. The problem created by the dynamic response of the control system as illustrated in the drawing is that the differential temperature responds in the wrong direction initially when the temperature of the feed is manipulated. For example, assume that the differential temperature is being controlled steadily at 15° F. with nearly constant feed and product temperatures, and a load change occurs, e.g., a lower concentration of acetylene is present in the feed, which decreases the differential temperature to 14° F., for example, by lowering the product temperature 1° F. a short period of time after it is fed to the catalyst bed. In response thereto, controller 19 acts on valve 15 to increase the feed temperature in order to increase the reaction and thereby increase the differential temperature across catalyst bed 11 to 15° F. When the feed temperature is initially increased, the differential temperature will initially decrease and actually be less than 14° F. until the change progresses through the reactor and the product temperature sensor responds thereto. Thus, the differential temperature initially responds in the wrong direction when the feed temperature is manipulated. This dynamic phenomenon can be compensated for according to this invention by introducing a lag into the control method preferably physically located in the output of temperature sensing and transmitting means 22, or in the output of differential temperature transmitter 24. Any means for introducing a first-order lag known in the art, can be utilized. For example, in a conventional pneumatic control system, a variable restriction such as a valve is imposed in the output signal line followed by a capacitance such as a properly sized volume. When properly adjusted or "tuned" for a specific situation, the response of the feed temperature is delayed so that it corresponds in transient behavior to the product temperature, thus eliminating spurious transient behavior of the temperature differential.

It must be understood that the use of this embodiment is not necessary in order to establish an adequate control system for an exothermic reaction; however, the use of this embodiment provides an improved quality of control of the process by eliminating unwanted and disturbing transient behavior in the process response to manipulation of catalytic bed feed temperature.

According to still another embodiment of this invention, a dead zone or differential gap is introduced into the control method in order to reduce the possibility of relay 25 oscillating between the differential temperature and the maximum-product-temperature control criteria. This may be termed "chatter" or "hunting." Thus, according to this embodiment, a dead band or dead zone is established in the product temperature and/or differential temperature measurements so that the measured values can vary somewhat, around the setpoint without operating the control system when the catalyst bed outlet temperature is the control criterion for controlling the temperature of the feed thereto. The dead zone can be expressed in terms of $t$, a preset temperature increment. For example, let the temperature of the feed be $T_1$, the maximum preset product temperature be $T_2$ (max.), the desired temperature differential across the catalyst bed be $\Delta T_s$. Thus, once relay 25 has switched and placed $T_2$ (max.) in control, then $T_2$ (max.) remains in control until $T_1 = T_2$ (max.) $- \Delta T_s - t$. Relay 25 will switch back and control $\Delta T_s$ when this equation is satisfied. Any suitable analog or digital computing and control means can be utilized to introduce the above-described criterion selection logic and a dead zone if desired, within my inventive process.

The above simple algebraic expression can be readily solved by electrical or pneumatic analog computing methods well known to those skilled in this art. Also, the solution of this expression and the logical operations performed therewith can be performed by well-known digital techniques.

It must be understood that the above-described dead-zone embodiment of this invention is not essential to maintain adequate control of an exothermic reaction according to this invention. However, the use of this embodiment will facilitate more effective temperature control of a process when the process is continuously operating near the maximum predetermined product temperature criterion.

As illustrated by the above-described embodiments, the control method of this invention can be completely carried out with conventional analog and/or digital pneumatic or electric computing, logic and control components. However, it must be understood that a digital computer can be utilized to carry out the complete control according to this invention by employing supervisory control and logic applied to direct digital control of the process. Such a computer can be programmed in a conventional manner to handle the dynamic response of the differential temperature and to perform the following functions. (1) Control the differential temperature at the differential temperature setpoint until the outlet temperature T reaches the preset maximum temperature $T_2$ (max.). (2) Control $T_2$ (max.) until $$Ti = T_2 \text{ (max.)} - \Delta T_s - t$$

where $t$ is the preset temperature increment representative of the dead zone. (3) Switch back and control $\Delta T_s$ when the equation in (2) above is satisfied.

As many embodiments may be made of the above invention, and changes may be made in the embodiments set forth above without departing from the scope of this invention, it is to be understood that all material hereinbefore set forth or shown in the drawing is to be interpreted as illustrative only and not to limit the scope of this invention.

I claim:

1. A method of controlling temperature in an exothermic reaction zone comprising:
   (a) measuring the temperature of a reactant feed stream passed to the reaction zone and a product stream taken from the reaction zone to obtain a measured differential temperature across said reaction zone;
   (b) comparing said measured temperature differential with a predetermined temperature differential;
   (c) manipulating the temperature of said reactant feed stream to yield said predetermined temperature differential between said reactant and products streams until the temperature of said product stream reaches a predetermined maximum temperature, at which time the manipulation of said reactant feed temperature is switched to yield product stream temperature no higher than said predetermined maximum product temperature.

2. The method of claim 1 further comprising switching back the manipulation of said reactant feed temperature to yield said predetermined differential temperature between said reactant feed and product streams when said product temperature drops below said pretermined maximum product temperature and said measured differential temperature is at least equal to said predetermined temperature differential.

3. The method according to claim 2 wherein the temperature of said feed stream is manipulated only after the immediately preceding feed stream temperature manipulation results in a temperature change of said product stream.

4. The method of claim 2 wherein said switching back occurs when the product stream temperature falls below said predetermined maximum product temperature and the differential temperature between said feed and product streams is greater than said predetermined temperature differential.

5. An apparatus for conducting exothermic chemical reactions having at least one reaction zone comprising:
   (a) a reactor means having an inlet and an outlet;
   (b) first conduit means communicating with the inlet of said reactor means;
   (c) second conduit means communicating with the outlet of said reactor means;
   (d) heat exchanger means for controlling the temperature of fluid flowing through said first conduit means;
   (e) means for measuring the temperature of fluid flowing through said first and said second conduit means and means for obtaining a differential temperature therebetween;
   (f) means for comparing said differential temperature with a predetermined temperature differential, and means for manipulating said heat exchange means to yield said predetermined temperature differential; and
   (g) means for manipulating said heat exchange means solely in response to the temperature of fluid flowing through said second conduit means when the temperature of the fluid flowing through said second conduit means reaches a predetermined maximum temperature.

6. Apparatus of claim 5 wherein said means for measuring the temperature and for obtaining the differential temperature comprises:
   (a) a first temperature sensing and transmitting means positioned in said first conduit between said heat exchanger means and said reactor means for producing an output representative of the temperature in said first conduit;
   (b) second temperature sensing and transmitting means positioned in said second conduit for producing an output representative of the temperature in said second conduit;
   (c) differential temperature transmitting means having first and second measurement inputs and an output; and
   (d) means for connecting the outputs from said first and second temperature sensing and transmitting means to said first and second measurement inputs of said differential temperature transmitting means.

7. The apparatus of claim 6 wherein said means for comparing and means for manipulating comprises:
   (a) third temperature sensing and transmitting means positioned in said second conduit for producing an output representative of the temperature in said second conduit;
   (b) selective relay means having first and second signal inputs and an output;
   (c) means for connecting the output of said differential temperature transmitter and said third temperature sensing and transmitting means to said first and second signal inputs of said relay means respectively;
   (d) first temperature controller means having a signal input, a setpoint signal input, and an output;
   (e) means for connecting the output of said relay means to said signal input of said first temperature controller means;
   (f) second temperature controller means having a signal input, a setpoint signal input, and an output;
   (g) fourth temperature and sensing transmitting means positioned in said first conduit between said heat exchanger means and said reactor means for producing an output representative of the temperature in said first conduit means;
   (h) means for connecting the outputs of said fourth temperature sensing and transmitting means and said first temperature controller means to said signal input and said setpoint signal input, respectively, of said second temperature controller means; and
   (i) means for connecting the output of said second temperature controller means to said heat exchanger means.

8. The apparatus of claim 7 wherein said reactor means is a catalytic reactor means.

References Cited

UNITED STATES PATENTS

| | | | |
|---|---|---|---|
| 1,923,865 | 8/1933 | Handforth | 23—288 X |
| 2,977,288 | 3/1961 | Cabbage | 208—143 X |
| 3,220,998 | 11/1965 | Berger | 23—253 X |
| 3,324,030 | 6/1967 | Calabrese et al. | 208—113 |
| 3,341,613 | 9/1967 | Hann | 208—143 |

HERBERT LEVINE, Primary Examiner

U.S. Cl. X.R.

23—230, 253, 284, 288; 208—143